US008750101B2

(12) United States Patent
Oh et al.

(10) Patent No.: US 8,750,101 B2
(45) Date of Patent: Jun. 10, 2014

(54) APPARATUS AND METHOD FOR TRANSMITTING AND RECEIVING CONTROL INFORMATION MESSAGE IN A COMMUNICATION SYSTEM

(75) Inventors: Chang-Yoon Oh, Yongin-si (KR); Geun-Hwi Lim, Seongnam-si (KR); Won-Il Roh, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1036 days.

(21) Appl. No.: 12/358,636

(22) Filed: Jan. 23, 2009

(65) Prior Publication Data

US 2009/0191860 A1 Jul. 30, 2009

(30) Foreign Application Priority Data

Jan. 25, 2008 (KR) .................. 10-2008-0008305

(51) Int. Cl.
*G01R 31/08* (2006.01)
*H04L 1/00* (2006.01)

(52) U.S. Cl.
USPC ........... 370/228; 370/329; 370/216; 370/328; 455/423; 455/452.1; 455/450

(58) Field of Classification Search
USPC ......... 370/228, 329, 216, 328, 345, 252, 312, 370/315, 352, 311; 455/423, 452.1, 450; 709/226
See application file for complete search history.

(56) References Cited

U.S. PATENT DOCUMENTS

| 2006/0098568 A1* | 5/2006 | Oh et al. ................. 370/206 |
| 2009/0070650 A1* | 3/2009 | Bourlas et al. ............ 714/748 |
| 2009/0138598 A1* | 5/2009 | Shrivastava et al. ........ 709/226 |

FOREIGN PATENT DOCUMENTS

WO 2007/030041 A1 3/2007

OTHER PUBLICATIONS

June Moon et al., Persistent allocation method for reducing MAP overhead, IEEE 802.16 Broadband Wireless Access Working Group, Jan. 14, 2008.

* cited by examiner

*Primary Examiner* — Charles C Jiang
*Assistant Examiner* — Jamal Javaid
(74) *Attorney, Agent, or Firm* — Jefferson IP Law, LLP (57) ABSTRACT

An apparatus and method for operating a base station and a mobile station in a communication system are provided. The operation of the base station includes persistently allocating resources to at least one mobile station and transmitting, in a current frame, a control information message including a change counter flag indicating whether persistent resource allocation information, transmitted in a previous frame, is changed. An operation of the mobile station includes receiving a control information message, including a change counter flag indicating whether persistent resource allocation information included in a control information message transmitted in a previous frame is changed, from a base station in a current frame and checking a value of the change counter flag.

20 Claims, 6 Drawing Sheets

APPARATUS AND METHOD FOR TRANSMITTING AND RECEIVING CONTROL INFORMATION MESSAGE IN A COMMUNICATION SYSTEM

PRIORITY

This application claims the benefit under 35 U.S.C. §119(a) of a Korean patent application filed in the Korean Intellectual Property Office on Jan. 25, 2008 and assigned Serial. No. 10-2008-0008305, the entire disclosures of which is hereby incorporated by reference.

BACKGROUND OF THE INVENTION

1. Field of the Invention

The present invention relates to an apparatus and method for transmitting and receiving a control information message including resource allocation information in a communication system.

2. Description of the Related Art

In a conventional communication system, a transmitter and a receiver, e.g., a Base Station (BS) and a Mobile Station (MS), use a frame structure to exchange data with each other. During the data exchange, the BS should efficiently allocate resources of each frame to MSs. One frame includes a DownLink (DL) interval and an UpLink (UL) interval. The DL interval includes a preamble, MAP, and DL data bursts, and the UL interval includes UL data bursts. The preamble includes information used for performing synchronization acquisition. The MAP is, for example, information that can be recovered from a Frame Control Header (FCH) included in the frame, and includes resource allocation information and a variety of information used for providing services to a receiver. Hence, an MS, which has received the frame, recovers DL data of the MS or transmits UL data of the MS to the BS by analyzing the MAP information. The DL data bursts are DL data that the BS transmits to the MS, and the UL data bursts are UL data that the MS transmits to the BS. Meanwhile, the MAP is used as a control information message by which the BS allocates resources to the MS.

When exchanging data with MSs, the BS should determine whether a control information message, or MAP, that includes resource allocation-related information (hereinafter 'resource allocation information'), which is transmitted to each MS individually, has been normally received at each of the MSs.

Under certain conditions, the BS transmits a MAP including resource allocation information to an arbitrary MS but the arbitrary MS fails to normally receive the MAP. In this case, the BS can transmit data using resource allocation information allocated to the arbitrary MS. However, the MS, which has failed to normally receive the MAP, cannot check the resource allocation information, making it impossible to ensure normal data transmission/reception.

Accordingly, the BS needs to determine whether a corresponding MS has normally received the MAP that the BS transmitted.

SUMMARY OF THE INVENTION

An aspect of the present invention is to address at least the above-mentioned problems and/or disadvantages and to provide at least the advantages described below. Accordingly, an aspect of the present invention is to provide an apparatus and method for transmitting and receiving a control information message in a communication system.

Another aspect of the present invention is to provide a control information message transmission/reception apparatus and method for determining whether a MAP has been normally received in a communication system.

Still another aspect of the present invention is to provide a MAP transmission/reception apparatus and method for determining whether a MAP, including resource allocation information, has been normally received in a communication system.

According to one aspect of the present invention, an operation method of a base station in a communication system is provided. The operation method includes persistently allocating resources to at least one mobile station and transmitting, in a current frame, a control information message including a change counter flag indicating whether persistent resource allocation information transmitted in a previous frame is changed.

According to another aspect of the present invention, an operation method of a mobile station in a communication system is provided. The operation method includes receiving a control information message including a change counter flag indicating whether persistent resource allocation information included in a control information message representative of control information transmitted in a previous frame is changed, from a base station in a current frame and checking a value of the change counter flag.

According to still another aspect of the present invention, an operation method of a base station in a communication system is provided. The operation method includes transmitting a control information message including persistent resource allocation information to at least one mobile station and receiving, from the at least one mobile station, information indicating whether the control information message has been normally received at the corresponding mobile station.

According to yet another aspect of the present invention, a communication system is provided. The communication system includes a base station for persistently allocating resources to at least one mobile station, and for transmitting a control information message including a change counter flag indicating whether persistent resource allocation information included in a control information message transmitted in a previous frame is changed, to at least one mobile station in a current frame.

According to still another aspect of the present invention, a communication system is provided. The communication system includes a mobile station for receiving a control information message including persistent resource allocation information and a change counter flag indicating whether persistent resource allocation information included in a control information message transmitted in a previous frame is changed, from a base station in a current frame, and for determining whether persistent resource allocation information included in the control information message transmitted in the previous frame is changed, according to a value of the change counter flag.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description when taken in conjunction with the accompanying drawings in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a MAP transmission/reception apparatus and method for determining whether a control information message, or MAP, has been normally received in a communication system. In an exemplary implementation, a MAP transmission/reception apparatus and method are provided in which a transmitter determines whether a corresponding receiver has normally received a MAP that the transmitter transmitted in a communication system.

Herein, the transmitter is assumed to be, e.g. a Base Station (BS), while the receiver is assumed to be, e.g. a Mobile Station (MS). For example, when the BS exchanges data with the MS, the MAP includes resource allocation-related information (hereinafter 'resource allocation information') which is transmitted to the MS. The MAP includes a DownLink MAP (DL MAP) and an UpLink MAP (UL MAP). The resource allocation information included in the MAP is valid only for the corresponding frame.

Traffic for Voice over Internet Protocol (VoIP), which is an Internet Protocol telephony technology that delivers voice information using an Internet Protocol (IP), is persistently allocated resources. The VoIP traffic is transmitted to a plurality of MSs using small-sized packets. In this case, if a MAP with resource allocation information is transmitted every frame, the resources may be wasted.

Therefore, for the data which is persistently allocated resources as stated above, a persistent resource allocation scheme is used in which resources, once allocated, are available for a certain period. The once allocated resources will be referred to herein as 'persistent resources'.

In the persistent resource allocation scheme, resource allocation information is valid for a certain period. For example, a BS allocates sub-bursts to a particular MS through a DL MAP message of a $k^{th}$ frame at a period of 4 frames from the $k^{th}$ frame. The BS transmits data traffic through the sub-bursts. The MS recognizes that the data traffic is transmitted over a resource domain (time-frequency domain) acquired through resource allocation information which is periodically allocated at a $k^{th}$ frame, a $(k+4)^{th}$ frame and a $(k+8)^{th}$ frame.

Exemplary embodiments of the present invention use the persistent resource allocation scheme as a resource allocation scheme for data transmission/reception between a BS and an MS.

The BS transmits resource allocation information for persistent resource allocation to the MS through a MAP at each frame corresponding to the period. The resource allocation information may include, for example, information for allocating resources, information for changing allocated resources, and information for deallocating allocated resources.

Thereafter, the BS can determine whether the resource allocation information has been normally received at the MS by receiving, from the MS, information indicating whether the MAP the BS transmitted has been normally received. The MS uses an Acknowledgement (ACK) message or a Negative Acknowledgement (NAK) message to notify the BS of its normal receipt of the MAP.

To receive information on the normal receipt of the MAP from the MS, the BS can use a Channel Quality Information Channel (CQICH) or an ACK Channel (ACKCH) allocated to the MS. The CQICH is a channel that the BS allocates to receive channel quality information from the MS, and the ACKCH is a channel that the BS allocates to the MS to receive an ACK message or a NAK message from the MS. By way of example, the CQICH is used herein for transmission/reception of the ACK message or NAK message between the BS and the MS. However, the ACKCH can also be used for transmission/reception of the ACK message or NAK message.

Figure 1:
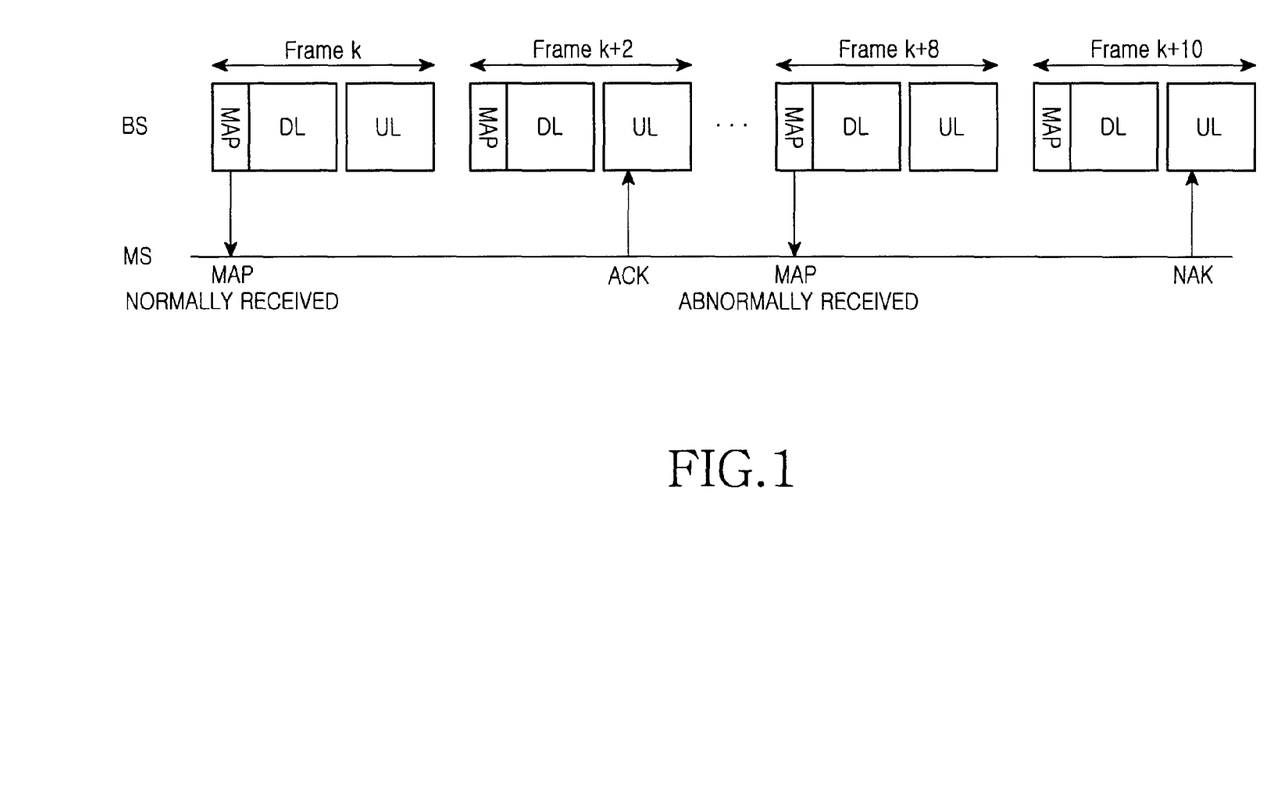
FIG. 1 is a diagram illustrating an operation of checking normal receipt of a MAP in a communication system according to an exemplary embodiment of the present invention.

FIG. 1 is a diagram illustrating an operation of checking normal receipt of a MAP in a communication system according to an exemplary embodiment of the present invention.

Referring to FIG. 1, a frame is shown which is transmitted from a BS to an MS. The frame is divided into, for example, a UL interval and a DL interval. The DL interval includes a preamble (not shown), MAP and DL data bursts, and the UL interval includes UL data bursts. The preamble includes information used for performing synchronization acquisition.

The MAP includes information that can be recovered from a Frame Control Header (FCH) included in the frame. The MAP also includes resource allocation information and a variety of information used for providing services to the MS. Therefore, an MS, which has received the frame, recovers DL data of the MS in the frame or transmits UL data of the MS to the BS by analyzing the MAP information. The resource allocation information includes, for example, data extraction information such as location and size of data in the frame.

The DL data bursts are DL data that the BS transmits to the MS, and the UL data bursts are UL data that the MS transmits to the BS.

The BS transmits only the MAP to the MS in a $k^{th}$ frame. The MAP, for example, DL MAP, includes resource allocation information. Herein, the MAP includes a Persistent allocation Information Element (Persistent allocation IE) which includes resource allocation information corresponding to the persistent resource allocation scheme. The Persistent allocation IE is assumed to allocate DL resources in the same region in the frame at a period of, for example, 4 frames. For instance, when transmitting the Persistent allocation IE in a $k^{th}$ frame, the BS periodically transmits resource allocation information at a $(k+4)^{th}$ frame, a $(k+8)^{th}$ frame and a $(k+12)^{th}$ frame. Although 4 frames are considered herein by way of example, the number of frames, which can be set as a period for transmission of resource allocation information, is variable according to the system condition and setup.

When the MS normally receives a MAP through the $k^{th}$ frame, the MS transmits to the BS an ACK message indicating the normal receipt of the MAP. Herein, as illustrated in FIG. 1, the frame in which the ACK message is transmitted is, for example, a $(k+2)^{th}$ frame. When the MS normally receives a MAP which is received through the $k^{th}$ frame, the MS can normally receive the Persistent allocation IE. Thereafter, the MS receives data in up to a $(k+3)^{th}$ frame using resource allocation information received in the k frame.

Meanwhile, the BS can transmit to the MS a MAP including resource allocation information for changing resource information allocated through the Persistent allocation IE or for deallocating the allocated resources. For example, the MAP including resource allocation information for changing the allocated resource information or deallocating the allocated resources is assumed to be transmitted through a $(k+8)^{th}$ frame. In this case, if the MS has failed to normally receive the MAP through the $(k+8)^{th}$ frame, the MS transmits to the BS a NAK message indicating the failure to normally receive the MAP. Herein, as illustrated in FIG. 1, the frame in which the NAK message is transmitted is, for example, a $(k+10)^{th}$ frame.

In other words, the MS determines whether it has normally received the MAP, and notifies the determination results to the BS. The MS expresses the determination results with an ACK message or a NAK message, and can transmit the ACK or NAK message through, for example, a CQICH allocated from the BS. The ACK message and the NAK message can be transmitted in the form of, for example, a codeword.

Figure 2:
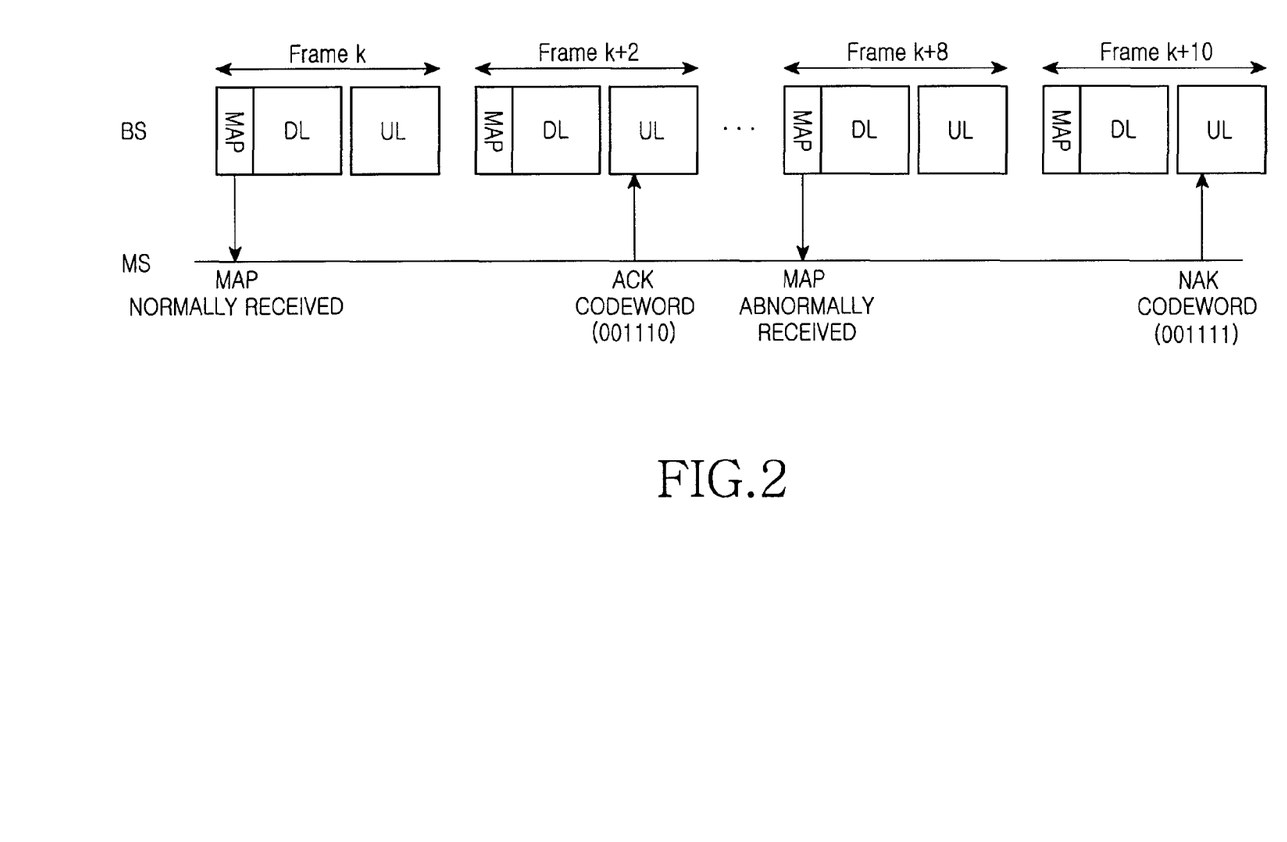
FIG. 2 is a diagram illustrating an operation of receiving by a BS an ACK message and a NAK message, to each of which a different codeword is allocated, in a communication system according to an exemplary embodiment of the present invention.

FIG. 2 is a diagram illustrating an operation of receiving by a BS an ACK message and a NAK message, to each of which a different codeword is allocated, in a communication system according to an exemplary embodiment of the present invention.

Since FIG. 2 is substantially equal to FIG. 1 in an operation of checking by a BS the normal receipt of a MAP at an MS, reference will be made to FIG. 1, and a more detailed description thereof is omitted.

When the MS normally receives a MAP from the BS through a $k^{th}$ frame, the MS transmits an ACK message to the BS. The ACK message uses, for example, a codeword '001111'.

Further, when the MS fails to normally receive a MAP from the BS through a $(k+8)^{th}$ frame, the MS transmits a NAK message to the BS. The NAK message can use, for example, a codeword '001111'.

The codewords for transmission of the ACK message and the NAK message are allocated by the BS to the MS using, for example, a CQICH allocation Information Element (CQICH allocation IE). The BS notifies the MS that it uses one of a physical Carrier to Interference Ratio (CINR) scheme and an effective CINR scheme at the time it allocates a CQICH to the MS using the CQICH allocation IE. For example, a 6-bit codeword is used as the codeword that the MS transmits to the BS.

When the BS manages the CQICH with the physical CINR scheme, an exemplary operation of the BS is as follows. The BS allocates a codeword in the scope of '010000' through '011111' among the 6-bit codewords so that the MS can notify the BS of a CINR which is divided into 32 steps. Next, it is assumed that the BS allocates the codeword in the scope of '100000' through '111111' to use it for checking the receipt of the group change message.

Meanwhile, when the BS manages the CQICH with the effective CINR scheme, its operation is as follows. The BS sets two bits, for example the first two bits in the 6-bit codewords, as '00', and receives a CINR report from the MS using the remaining 4 bits. Actually, though the 6-bit codewords are used, since 2 bits are unused, it is equivalent to using 16 codewords.

When the MS reports channel quality information, for example, a CINR, using the 4 bits, the MS determines a Modulation and Coding Scheme (MCS) level, and transmits one of the codewords included in the scope (12 codewords) of '000000' through '001011' according to the determined MCS level.

When the BS uses the effective CINR scheme, it uses reserved codewords which are not defined in the standard. Examples of the reserved codewords for notifying the normal receipt of a MAP are shown in Table 1.

| Label | Encoding | |
|---|---|---|
| 13 | 0b1101 | ACK for MAP receive |
| 14 | 0b1110 | NAK for MAP receive |
| 15 | 0b1111 | ertPS |

An exemplary codeword for transmission of an ACK message for notifying normal receipt of the MAP is '0b1101', while an exemplary codeword for transmission of a NAK message for notifying abnormal receipt of the MAP is '0b1110'. In Table 1, 'Label' denotes that the corresponding codewords among the available codewords #0 to #15 are codewords #13, #14 and #15, and 'b' in the 'Encoding' field denotes that its succeeding numbers are binary numbers. When the MS actually transmits a codeword over a CQICH, it transmits the first two bits as '00' and transmits the remaining 4 bits as defined.

Meanwhile, for the use of the effective CINR scheme, a codeword for an extended real-time Polling Service (ertPS) for support of the persistent resource allocation scheme should be defined. A codeword for the ertPS is, for example, '0b1111'. In FIGS. 1 and 2, the effective CINR scheme is used by way of example.

As described above, in the foregoing example, the BS and the MS use separate codewords for the ACK message and the NAK message. As another example, the BS and the MS can use one codeword for the ACK message and the NAK message.

Figure 3:
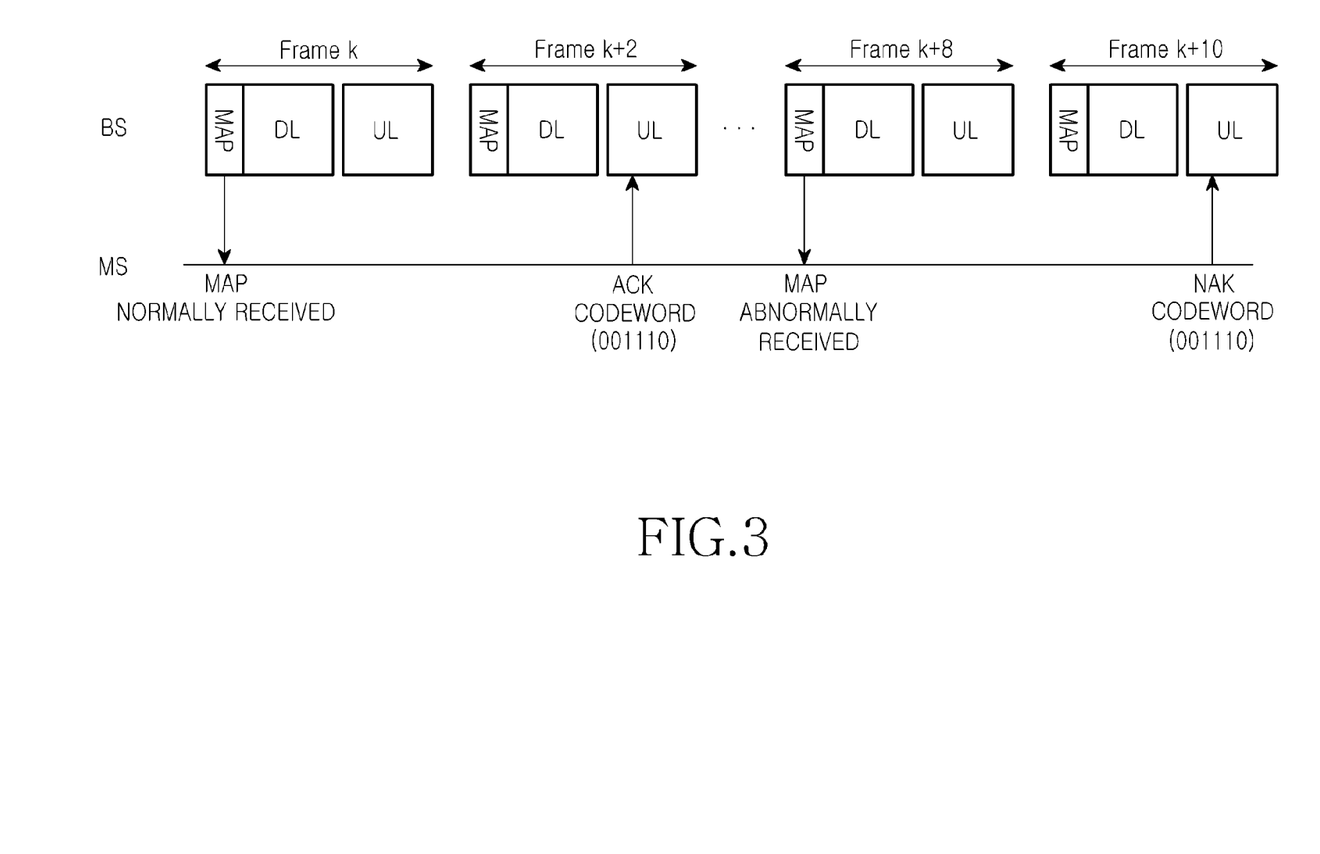
FIG. 3 is a diagram illustrating a method of receiving by a BS an ACK message and a NAK message, to both of which only one codeword is allocated, in a communication system according to an exemplary embodiment of the present invention.

FIG. 3 is a diagram illustrating a method of receiving by a BS an ACK message and a NAK message, to both of which only one codeword is allocated, in a communication system according to an exemplary embodiment of the present invention.

Referring to FIG. 3, the BS transmits a MAP in a $k^{th}$ frame, and the MAP includes a Persistent allocation IE which is resource allocation information based on the persistent resource allocation scheme.

When the MS normally receives the MAP in the $k^{th}$ frame, it transmits an ACK message to the BS in a $(k+2)^{th}$ frame. The transmitted ACK message is, for example, a codeword '001110'.

The BS transmits a MAP in a $(k+8)^{th}$ frame, and the MAP includes resource allocation information allocated to the MS. When the MS fails to normally receive the MAP in the $(k+8)^{th}$ frame, it transmits a NAK message to the BS in a $(k+10)^{th}$ frame. The transmitted NAK message is a codeword '001110', which is equal to the codeword of the ACK message.

Meanwhile, in a case where there are resources allocated through the Persistent allocation IE, when the MS fails to normally receive a MAP in a corresponding frame, the MS transmits the same codeword '001110' as the ACK message to the BS. Here, the codeword '001110' that the MS transmits means a NAK message.

Thereafter, even though the BS receives from the MS the same codeword as the codeword of the ACK message, the BS regards the same codeword as an ACK message when it receives a codeword '001110' from the MS before it is allocated resources by transmitting a Persistent allocation IE through a MAP. However, the BS regards the same codeword as a NAK message when the BS receives from the MS the same codeword '001110' as the codeword of an ACK message after it is allocated resources by transmitting a Persistent allocation IE through a MAP.

Even in FIG. 3, the MS transmits a codeword for transmission of an ACK message and a NAK message, to the BS over a CQICH.

Next, with reference to FIGS. 4 to 6, a description will be made of an exemplary resource allocation operation carried out when the BS receives from the MS a NAK message indicating a failure to normally receive the MAP.

When a BS receives a NAK message from an MS, the BS transmits to the MS a change counter flag indicating resource deallocation and resource change information allocated in the previous frame period. In the following description, the BS manages the counter flag using a single bit of '0' or '1', by way of example.

More specifically, when the BS did not transmit resource deallocation and resource change information in the previous frame period, the BS transmits the change counter flag after setting it to '0' (change counter flag=0). When the resource deallocation or resource change information was transmitted in the previous frame period, the BS transmits the change counter flag after setting it to '1' (change counter flag=1). Of course, the bit can be set in the opposite way. In other words, when resource deallocation and resource change information was not transmitted in the previous frame period, the BS transmits the change counter flag to the MS after setting it to '1' (change counter flag=1), and when the resource deallocation or resource change information was transmitted in the previous frame period, the BS transmits the change counter flag to the MS after setting it to '0' (change counter flag=0).

In an exemplary implementation, the change counter flag can be managed with two or more bits. Next, an exemplary operation carried out when the change counter flag is managed with 2 bits will be described.

Figure 4:
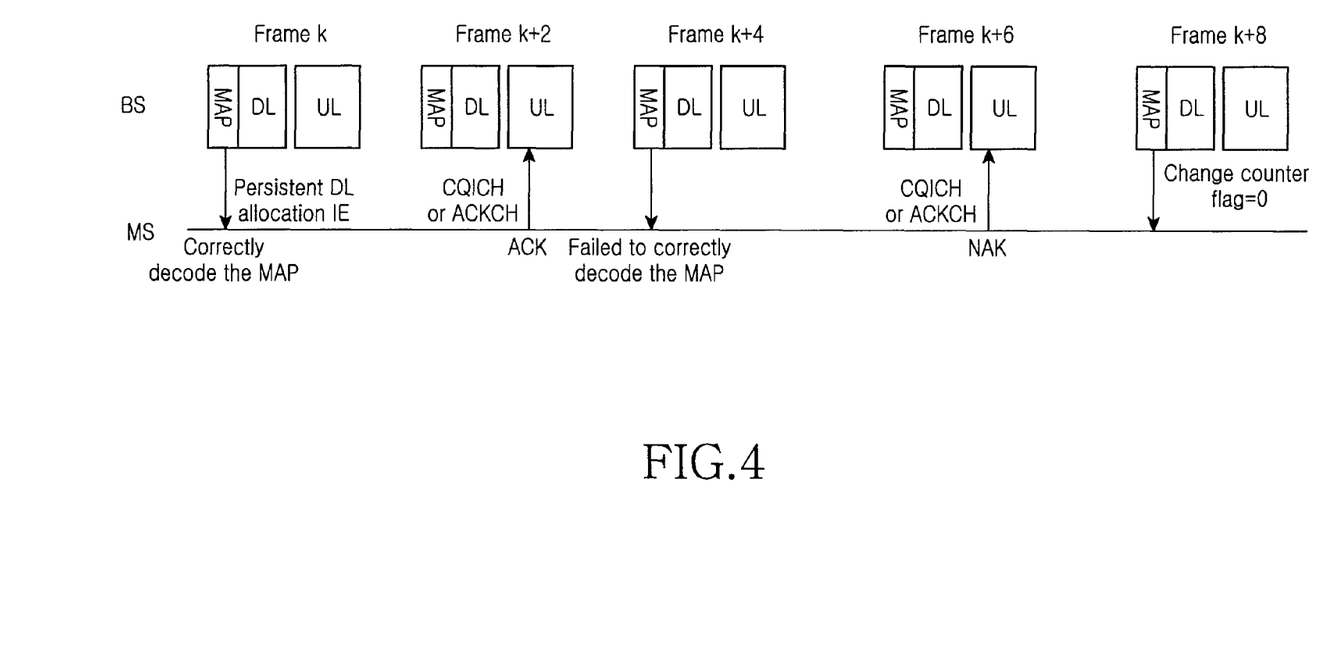
FIG. 4 is a diagram illustrating an operation carried out when a BS does not transmit resource deallocation information or resource change information in a $(k+4)^{th}$ frame in a communication system according to an exemplary embodiment of the present invention.

FIG. 4 is a diagram illustrating an operation carried out when a BS does not transmit resource deallocation information or resource change information in a $(k+4)^{th}$ frame in a communication system according to an exemplary embodiment of the present invention.

In the exemplary case of FIG. 4, the BS does not transmit resource deallocation information or resource change information through a MAP in the previous frame $((k+4)^{th}$ frame). That is to say, the BS transmits a change counter flag being set as '00' (change counter flag=00) to the MS through a MAP in the $(k+4)^{th}$ frame. The BS sets the change counter flag to '00' and transmits it to the MS through a MAP of a $(k+8)^{th}$ frame. The BS sets the same change counter flag as the change counter flag transmitted in the previous frame, as '00', and transmits it through a MAP of the $(k+8)^{th}$ frame. That is, the transmission of the same change counter flag as that in the $(k+4)^{th}$ frame indicates that no resource deallocation information and resource change information was transmitted in a MAP of the previous frame period $((k+4)^{th}$ frame).

Meanwhile, assume that a particular MS has failed to normally receive a MAP in the $(k+4)^{th}$ frame. The MS discards data, or data bursts, in an allocated resource domain, which was transmitted in the $(k+4)^{th}$ frame, because resource deallocation information may be included in the MAP that the MS has failed to normally receive. Therefore, the MS prepares to deallocate the resources allocated to the MS, when it has failed to receive a MAP of a frame including the persistent allocation information.

The MS transmits to the BS in a $(k+6)^{th}$ frame a NAK message indicating the failure to normally receive the MAP in the $(k+4)^{th}$ frame. When the MS receives a MAP with a change counter flag set as '00' from the BS in the $(k+8)^{th}$ frame, the MS recognizes that no resource change information or resource deallocation information was transmitted in the MAP of the $(k+4)^{th}$ frame.

As a result, the MS checks the change counter flag received in the $k^{th}$ frame where it has last received the normal MAP. When the change counter flag is set as '00', the MS continues to use the persistent allocation information allocated in the $k^{th}$ frame. That is, the MS continuously uses the resources without deallocation.

Figure 5:
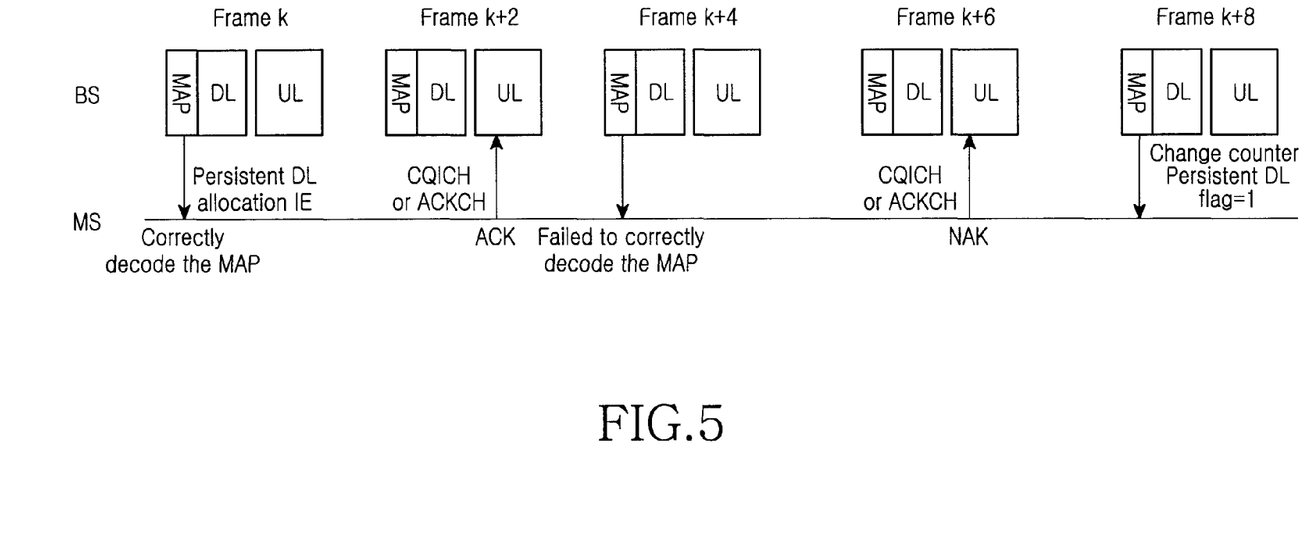
FIG. 5 is a diagram illustrating an operation carried out when a BS transmits resource deallocation information or resource change information in a $(k+4)^{th}$ frame in a communication system according to an exemplary embodiment of the present invention.

FIG. 5 is a diagram illustrating an operation carried out when a BS transmits resource deallocation information or resource change information in a $(k+4)^{th}$ frame in a communication system according to an exemplary embodiment of the present invention.

In the exemplary case of FIG. 5, the BS transmits resource deallocation information or resource change information through a MAP in the previous frame $((k+4)^{th}$ frame). In other words, the BS sets a change counter flag as '01' and transmits it to the MS through a MAP of a $(k+8)^{th}$ frame. Setting the change counter flag as '01' indicates that the resource deallocation information or resource change information was transmitted in the MAP of the previous frame period $((k+4)^{th}$ frame).

In the case where there is an MS that transmitted a NAK message in the $(k+2)^{th}$ frame, if the BS has not deallocated the resources allocated to the MS that sent the NAK in the $(k+4)^{th}$ frame, in other words, the BS sets a change counter flag as '00' the BS re-allocates the resources originally allocated to the MS that sent the NAK. At this point, when the BS has changed the resources, it retransmits the resource change information to the MS that sent the NAK.

The BS receives the NAK message from a particular MS in a $(k+6)^{th}$ frame. When the BS did not transmit resource deallocation information to the particular MS in the MAP of the $(k+4)^{th}$ frame, i.e., when the BS set the change counter flag as '00', the BS re-allocates the originally allocated resources to the particular MS through the MAP of the $(k+8)^{th}$ frame. When the resource change information was transmitted to the MS in the MAP of the $(k+4)^{th}$ frame, the BS retransmits the resource change information in the $(k+8)^{th}$ frame.

In one example, it is assumed that the particular MS has failed to normally receive the MAP in the $(k+4)^{th}$ frame. The particular MS discards data, or data bursts, in the allocated resource region in the $(k+4)^{th}$ frame because resource deallocation information may be included in the MAP that the particular MS has failed to normally receive. Therefore, the particular MS prepares to deallocate the resources allocated to the particular MS, when it has failed to receive a MAP of a frame including the resource allocation information, for example, persistent allocation information.

The particular MS transmits to the BS in a $(k+6)^{th}$ frame a NAK message indicating the failure to normally receive the MAP in the $(k+4)^{th}$ frame. When the particular MS receives a MAP with a change counter flag set as '01' from the BS in the $(k+8)^{th}$ frame, the MS recognizes that resource change information or resource deallocation information was transmitted in the MAP of the $(k+4)^{th}$ frame. Further, when resource change information is transmitted to the MS in the $(k+8)^{th}$ frame, the MS determines that the resource change information was transmitted to the MS through the MAP of the $(k+4)^{th}$ frame. At this point, if resource allocation information is transmitted to the particular MS through the MAP of the $(k+8)^{th}$ frame, the particular MS receives data from the BS through the resources which are allocated to the particular MS using the resource allocation information.

Figure 6:
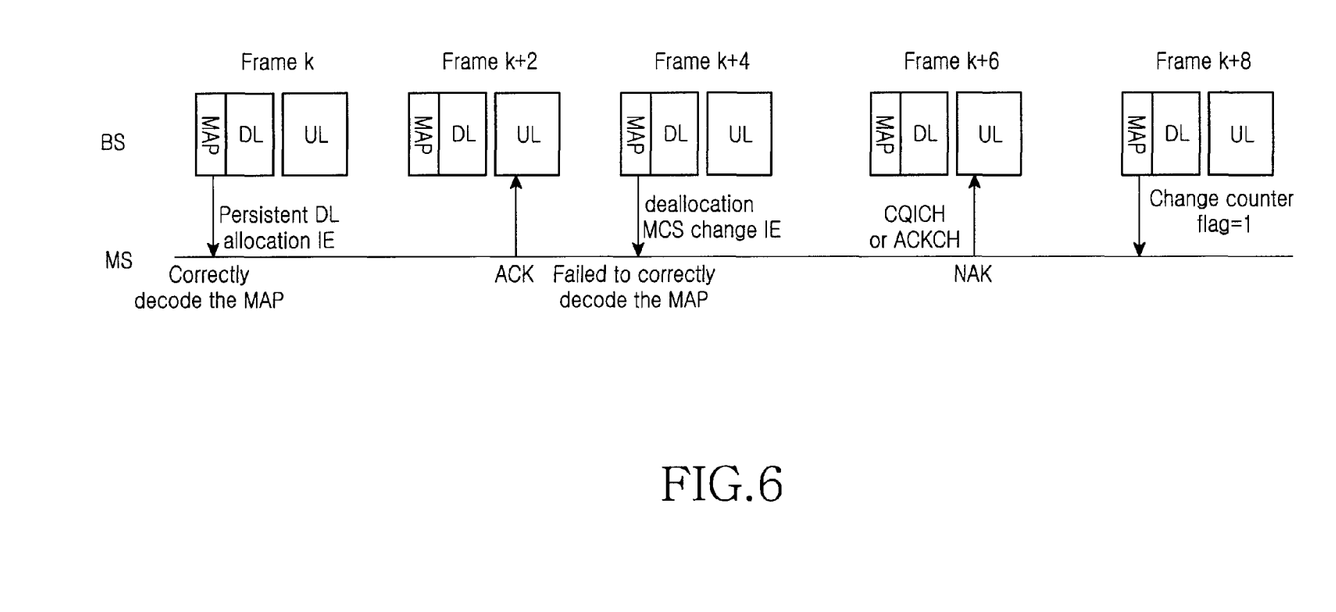
FIG. 6 is a diagram illustrating an operation carried out when a BS transmits resource deallocation information or resource change information in a $(k+4)^{th}$ frame in a communication system according to an exemplary embodiment of the present invention.

FIG. 6 is a diagram illustrating an operation carried out when a BS transmits resource deallocation information or resource change information in a $(k+4)^{th}$ frame in a communication system according to an exemplary embodiment of the present invention.

In the exemplary case of FIG. 6, the BS transmits resource deallocation information or resource change information through a MAP in the previous frame ($(k+4)^{th}$ frame). That is, the BS sets a change counter flag as '01' and transmits it through a MAP of a $(k+8)^{th}$ frame. Setting the change counter flag as '01' indicates that the resource deallocation information or resource change information was transmitted in the MAP of the previous frame period ($(k+4)^{th}$ frame).

In the case where there is an MS that sent a NAK message in the $(k+2)^{th}$ frame, if the BS has deallocated the resources allocated to the MS that sent the NAK in the $(k+4)^{th}$ frame, the BS does not transmit resource allocation information or resource change information to the MS that sent the NAK message.

The BS receives the NAK message from the particular MS in a $(k+6)^{th}$ frame. When the BS transmitted resource deallocation information to the particular MS in the MAP of the $(k+4)^{th}$ frame, the BS sets the change counter flag as '01' and transmits it in the $(k+8)^{th}$ frame, without re-allocating the originally allocated resources to the particular MS through the MAP of the $(k+8)^{th}$ frame. In other words, the BS notifies the MS that the resource deallocation information was transmitted in the MAP of the previous frame ($(k+4)^{th}$ frame), by transmitting no resource allocation information to the particular MS.

Meanwhile, assume that the particular MS has failed to normally receive the MAP in the $(k+4)^{th}$ frame. The particular MS discards data, or data bursts, in the allocated resource region in the $(k+4)^{th}$ frame because resource deallocation information may be included in the MAP that the particular MS has failed to normally receive in the $(k+4)^{th}$ frame. Therefore, the particular MS prepares to deallocate the resources allocated to the particular MS, when it has failed to receive a MAP of a frame including the resource allocation information, for example, persistent allocation information. The particular MS transmits to the BS in a $(k+6)^{th}$ frame a NAK message indicating the failure to normally receive the MAP in the $(k+4)^{th}$ frame. When the particular MS receives a MAP with a change counter flag set as '01' from the BS in the $(k+8)^{th}$ frame, the MS recognizes that resource deallocation information was transmitted in the MAP of the $(k+4)^{th}$ frame. At this point, the particular MS deallocates the previously allocated resources.

When the particular MS has failed to normally receive the MAP in the $(k+4)^{th}$ frame, the particular MS transmits a NAK message indicating the failure to the BS in the $(k+6)^{th}$ frame. When the particular MS receives in the $(k+8)^{th}$ frame the same change counter flag as the change counter flag received in the $k^{th}$ frame, the MS determines that no resource change information or resource deallocation information was transmitted in the $(k+4)^{th}$ frame. Hence, the particular MS normally receives data from the BS using the resource allocation information received in the $k^{th}$ frame.

Meanwhile, when the particular MS does not receive separate resource allocation information and resource change information after receiving in the $(k+8)^{th}$ frame a change counter flag different from the change counter flag received in the $k^{th}$ frame, the MS determines that the resource deallocation information was transmitted in the $(k+4)^{th}$ frame.

When the MS fails to normally receive the MAP in the $(k+4)^{th}$ frame, it transmits a NAK message to the BS. Moreover, when the MS receives separate resource allocation information and resource change information after receiving in the $(k+8)^{th}$ frame the change counter flag different from the change counter flag received in the $k^{th}$ frame, the MS determines that the resource deallocation information was not transmitted in the $(k+4)^{th}$ frame. Thereafter, the particular MS exchanges data with the BS using the resource allocation information or resource change information received in the (k+8)th frame. In other words, when the MS fails to receive a MAP in the current frame period, the MS determines whether to use the allocated resource allocation information or to stop the use of the allocated resource allocation information according to a value of the change counter flag received in the next frame period and whether or not resource allocation information and resource change information is received.

As is apparent from the foregoing description, exemplary embodiments of the present invention propose an ACK or NAK message for notifying of the normal/abnormal receipt of a control information message transmitted/received between a transmitter and a receiver, e.g. BS and MS, in a communication system. In this way, the BS can determine whether the MAP has been normally received at the MS, and can also determine whether a MAP with resource allocation information has been normally received at the MS. In addition, when the MS fails to normally receive the resource allocation information, the BS can retransmit the failed resource allocation information.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for receiving a control information message by a mobile station in a communication system, the method comprising:
   if normal reception of a first control information message in a previous frame is failed,
   transmitting, to a base station, a Negative Acknowledgement (NAK) message,
   stopping use of persistently allocated resources until a change counter flag, indicating whether persistent resource allocation information included in the first control information message is changed, is obtained,
   receiving, from the base station in a current frame, a second control information message including the change counter flag;
   checking a value of the change counter flag; and
   recognizing whether or not persistent resource allocation between the current frame and the previous frame is changed according to the checked value,
   wherein the first control information message and the second control information message are not stored by the mobile station.

2. The method of claim 1, wherein if the checked value indicates change of persistent resource allocation information, recognizing the change of the persistent resource allocation information, and receiving data from the base station using new resource allocation information obtained from the second control information message; and
   if the checked value indicates no change of the persistent resource allocation information, recognizing the no change of the persistent resource allocation information, and receiving data from the base station using persistently allocated resources.

3. The method of claim 1, further comprising:
   determining use or deallocation of the persistently allocated resources according to the value of the change counter flag.

4. The method of claim 1, wherein a same codeword is set for an Acknowledgement (ACK) message and the NAK message indicating whether the first control information message has been normally received at the corresponding mobile station.

5. The method of claim 4, further comprising:
   if the first control information message has not been normally received, transmitting to the base station the codeword including no persistent resource allocation information; and
   if the first control information message has been normally received, transmitting to the base station the codeword including the persistent resource allocation information.

6. A method for transmitting a control information message by a base station in a communication system, the method comprising:
   transmitting, in a previous frame, a first control information message including persistent resource allocation information to at least one mobile station;
   receiving, from the at least one mobile station, a message indicating whether the first control information message has been normally received at the corresponding mobile station; and
   if the message is a Negative Acknowledgement (NAK) message indicating that the first control information message has not been normally received, transmitting, in a current frame, a second control information message including a change counter flag indicating whether the persistent resource allocation information transmitted is changed, to the at least one mobile station,
   wherein the first control information message and the second control information message are not stored by the at least one mobile station, and
   wherein a value of the change counter flag indicates whether or not persistent resource allocation between the current frame and the previous frame is changed, and
   wherein the at least one mobile station transmitting the NAK message, stops use of persistently allocated resources by the base station until the change counter flag is obtained.

7. The method of claim 6, wherein use or deallocation of persistently allocated resources, corresponding to the persistent resource allocation information, by the at least one mobile station, is determined according to the value of the change counter flag.

8. The method of claim 7, wherein if the value of the change counter flag indicates a change of the persistent resource allocation information, by the at least one mobile station, the deallocation of the persistently allocated resources is determined; and
   if the value of the change counter flag indicates no change of the persistent resource allocation information, by the at least one mobile station, continuous use of the persistently allocated resources is determined.

9. The method of claim 6, wherein a same codeword is set for an Acknowledgement (ACK) message and a Negative Acknowledgement (NAK) message indicating whether the first control information message has been normally received at the corresponding mobile station.

10. The method of claim 9, further comprising:
    recognizing that a NAK message is received if the codeword is received from a mobile station that transmitted no persistent resource allocation information; and
    recognizing that an ACK message is received if the codeword is received from a mobile station that transmitted the persistent resource allocation information.

11. A base station for transmitting a control information message in a communication system, the base station comprising:
    a transmitter for transmitting, in a previous frame, a first control information message including persistent resource allocation information to at least one mobile station;
    a receiver for receiving a message indicating whether the first control information message has been normally received at the corresponding mobile station, from the at least one mobile station; and
    a controller for persistently allocating resources to the at least one mobile station, and if the message is a Negative Acknowledgement (NAK) message indicating that the first control information message has not been normally received, controlling transmitting of the transmitter, in a current frame, a second control information message including a change counter flag, indicating whether persistent resource allocation information transmitted is changed, to the at least one mobile station, wherein the first control information message and the second control information message are not stored by the at least one mobile station, wherein a value of the change counter flag indicates whether or not persistent resource allocation between the current frame and the previous frame is changed, and wherein the at least one mobile station transmitting the NAK message, stops use of persistently allocated resources by the base station until the change counter flag is obtained.

12. The base station of claim 11, wherein use or deallocation of persistently allocated resources, corresponding to the persistent resource allocation information, by the at least one mobile station, is determined according to a value of the change counter flag.

13. The base station of claim 12, wherein if the controller sets the value of the change counter flag as a value indicating a change of the persistent resource allocation information, by the at least one mobile station, the deallocation of the persistently allocated resources is determined, and if the controller sets the value of the change counter flag as a value indicating no change of the persistent resource allocation information, by the at least one mobile station, continuous use of the persistently allocated resources is determined.

14. The base station of claim 13, wherein a same codeword is set for an Acknowledgement (ACK) message and a Negative Acknowledgement (NAK) message indicating whether the first control information message has been normally received at the corresponding mobile station.

15. The base station of claim 14, wherein the controller recognizes that a NAK message is received if the codeword is received from a mobile station that transmitted no persistent resource allocation information, and recognizes that an ACK message is received if the codeword is received from a mobile station that transmitted the persistent resource allocation information.

16. A mobile station for receiving a control information message in a communication system, the mobile station comprising:

a receiver for if normal reception of a first control information message in a previous frame is failed, transmitting, to a base station, a Negative Acknowledgement (NAK) message, and stopping use of the persistently allocated resources until a change counter flag, indicating whether persistent resource allocation information included in the first control information message is changed, is obtained, receiving, from the base station in a current frame, a second control information message, including the change counter; and a controller for checking a value of the change counter flag; and recognizing whether or not persistent resource allocation between the current frame and the previous frame is changed according to the checked value, wherein the first control information message and the second control information message are not stored by the mobile station.

17. The mobile station of claim 16, wherein if the checked value indicates a change of the persistent resource allocation information, the controller recognizes the change of the persistent resource allocation information, and the receiver receives data from the base station using new resource allocation information obtained from the second control information message, and if the checked value indicates no change of the persistent resource allocation information, the controller recognizes no change of the persistent resource allocation information, and the receiver receives data from the base station using persistently allocated resources.

18. The mobile station of claim 16, wherein the controller determines use or deallocation of the persistently allocated resources according to the value of the change counter flag.

19. The mobile station of claim 16, wherein a same codeword is set for an Acknowledgement (ACK) message and the NAK message indicating whether the first control information message has been normally received at the corresponding mobile station.

20. The mobile station of claim 19, further comprising:

if the first control information message has not been normally received, the controller transmits to the base station the codeword including no persistent resource allocation information; and if the first control information message has been normally received, the controller transmits to the base station the codeword including the persistent resource allocation information.

* * * * *